Aug. 24, 1926.  
W. G. STEVENS, JR  
1,597,253  
GEAR SHIFTER  
Filed July 23, 1925 13 Sheets-Sheet 6

Fig. 6.

NEUTRAL

WITNESSES  
INVENTOR  
William G. Stevens Jr.  
BY  
ATTORNEYS

Aug. 24, 1926.
W. G. STEVENS, JR
1,597,253
GEAR SHIFTER
Filed July 23, 1925    13 Sheets-Sheet 7
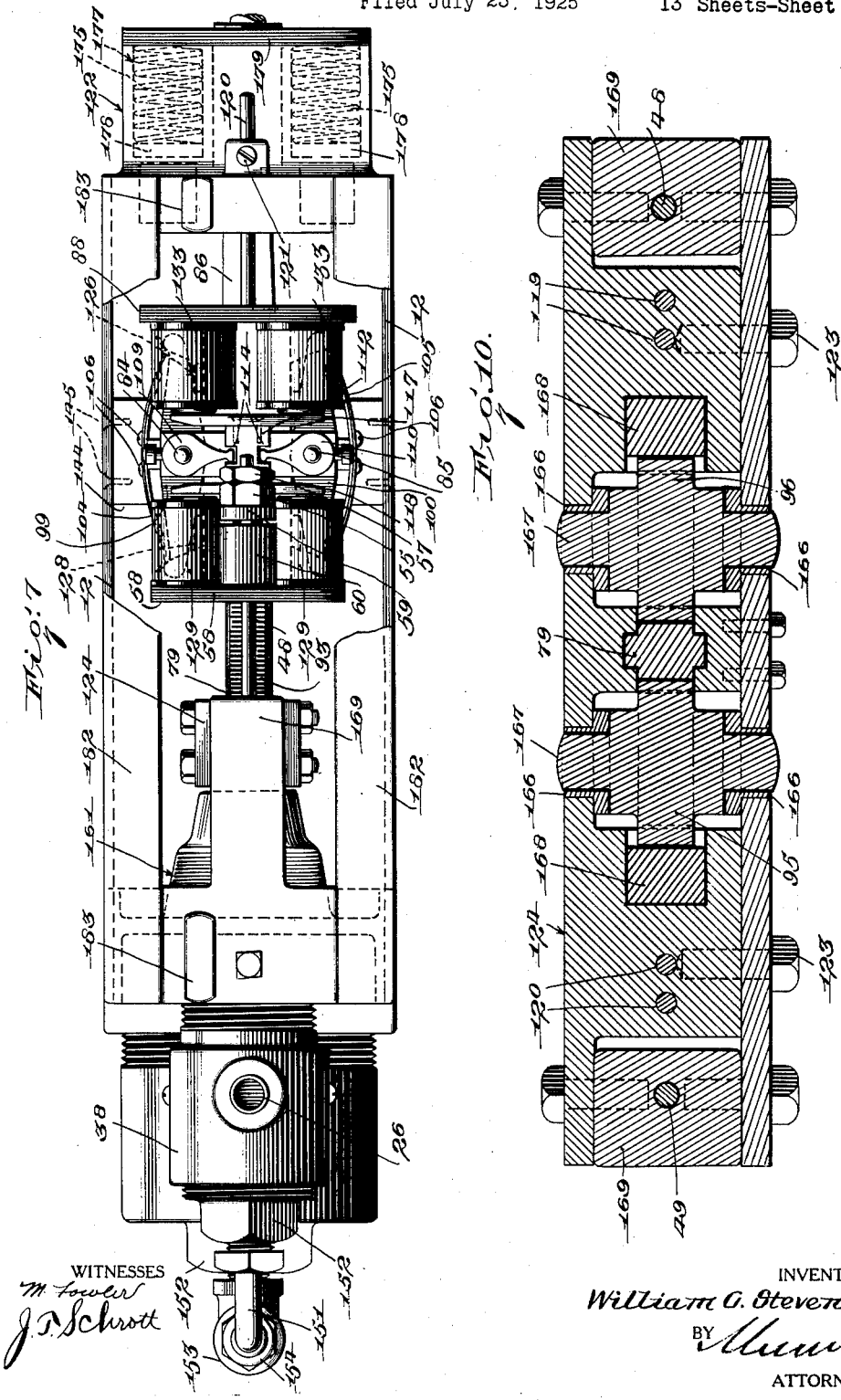
INVENTOR
William G. Stevens Jr.
BY 
ATTORNEYS

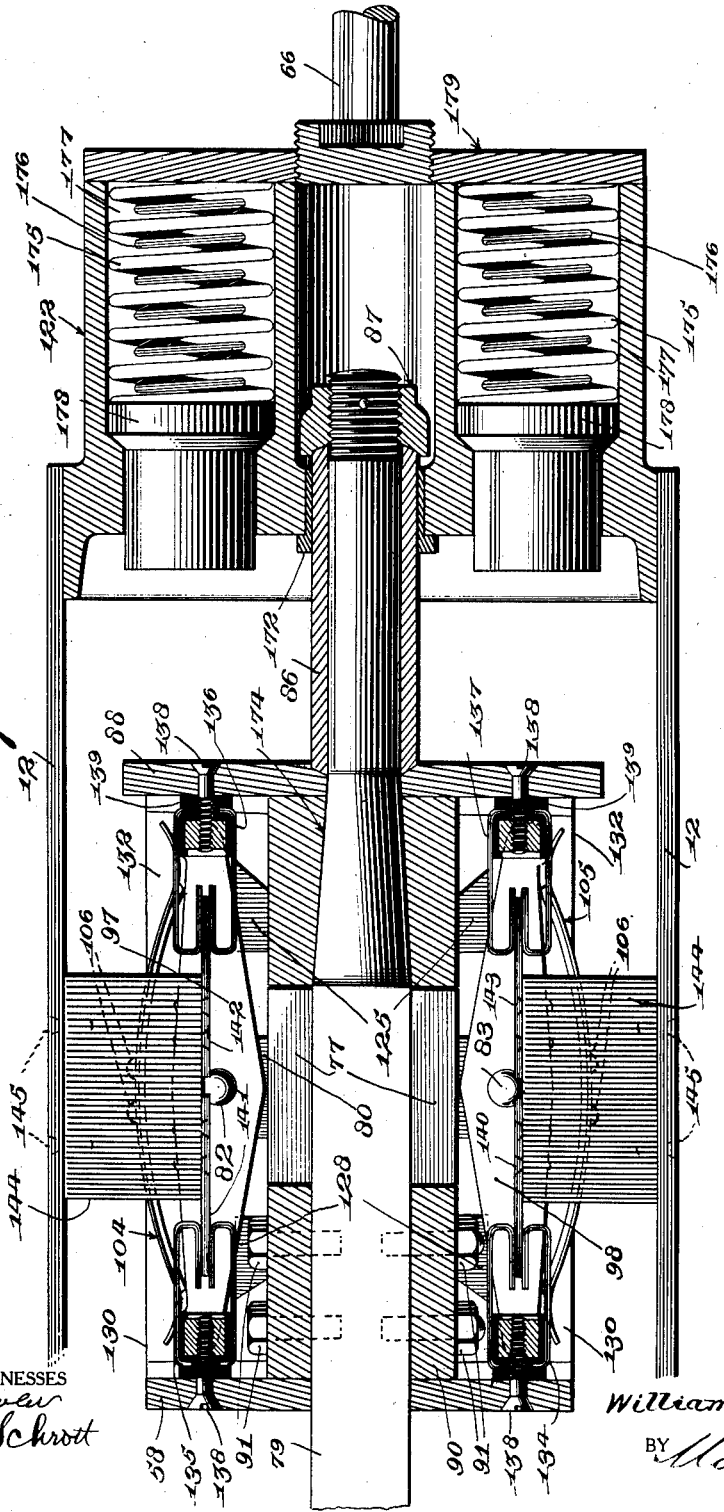

Aug. 24, 1926.  
W. G. STEVENS, JR  
1,597,253  
GEAR SHIFTER  
Filed July 23, 1925    13 Sheets-Sheet 9
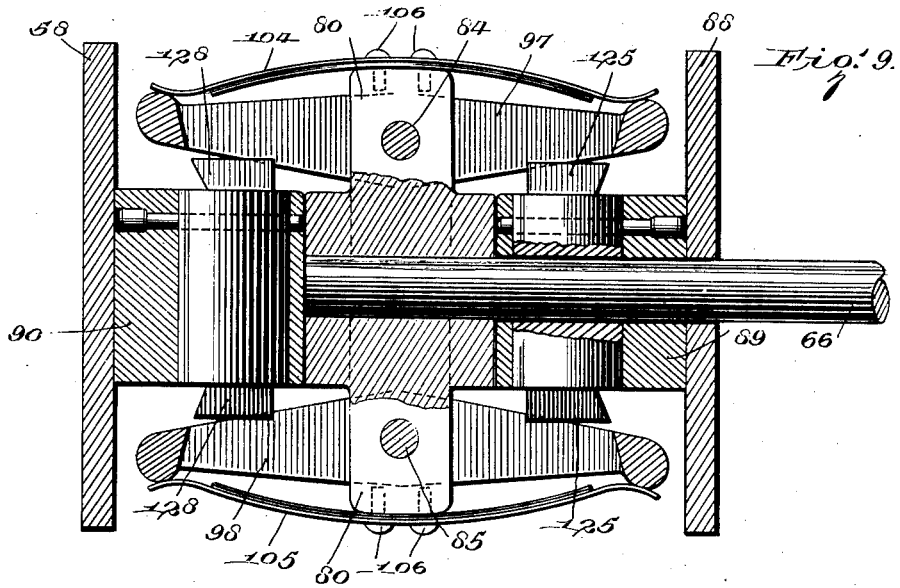
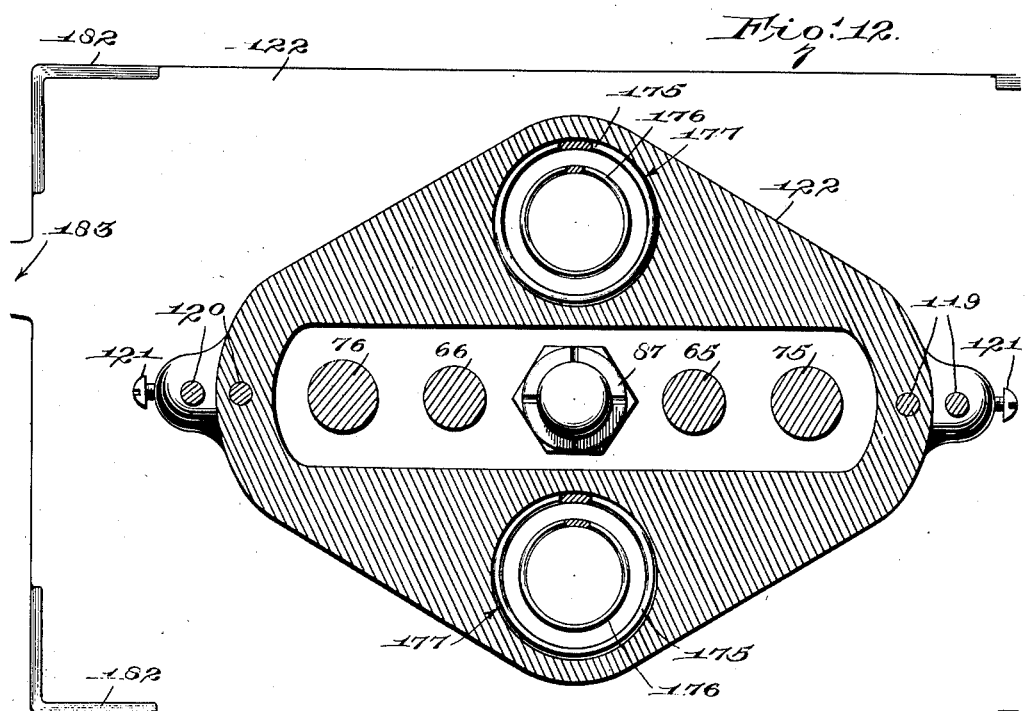

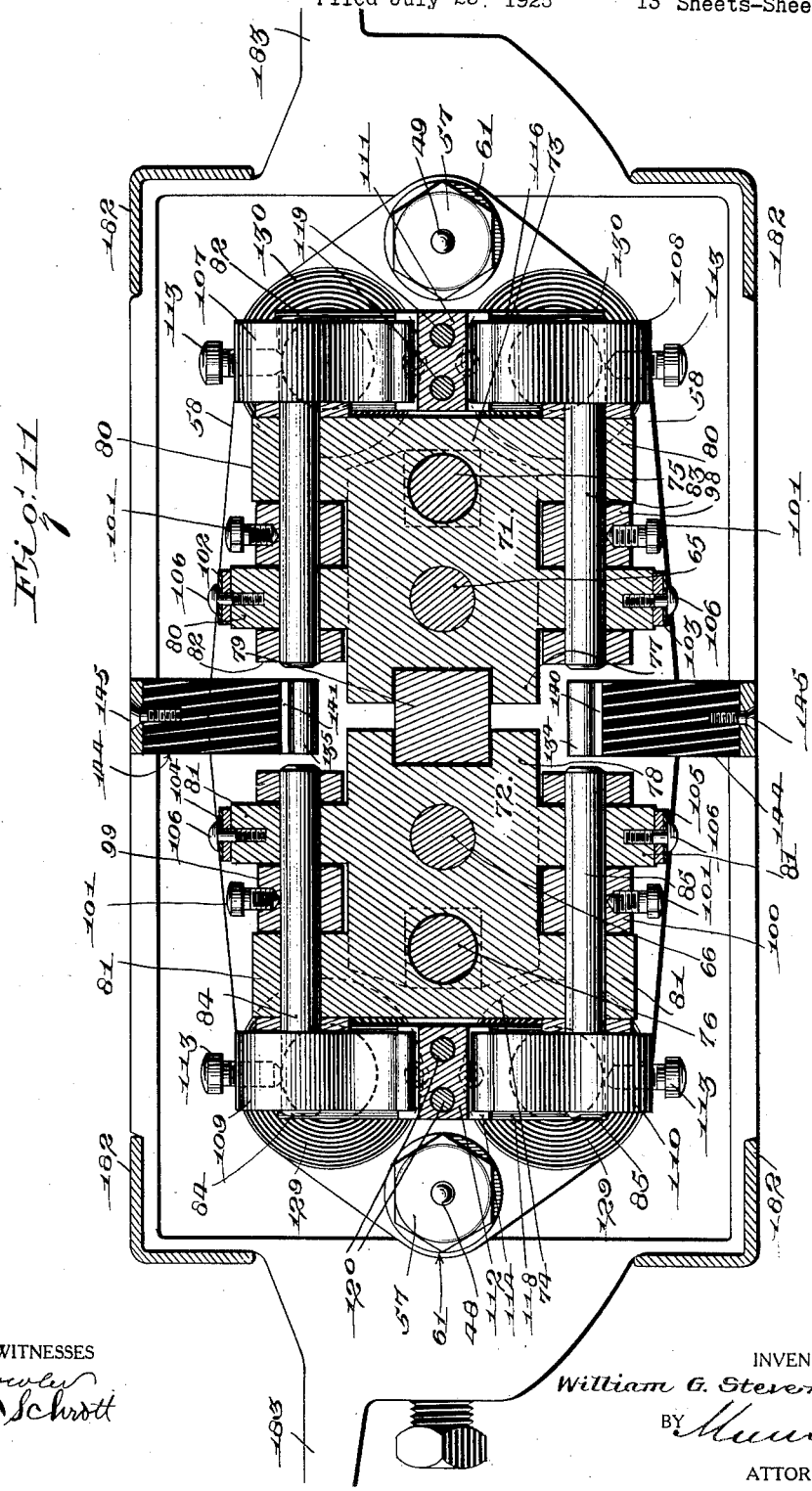

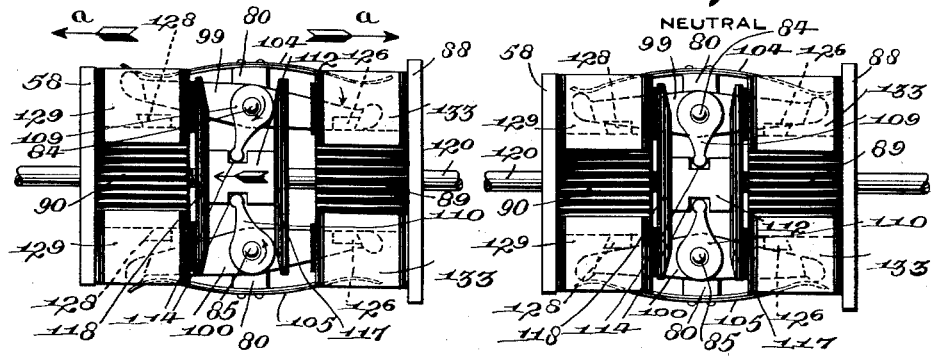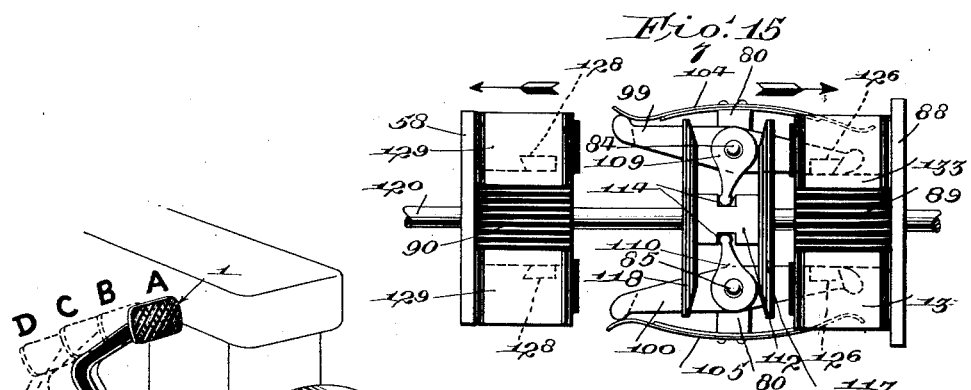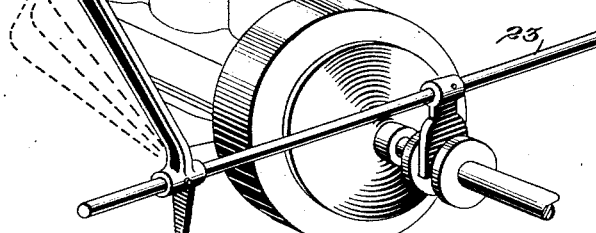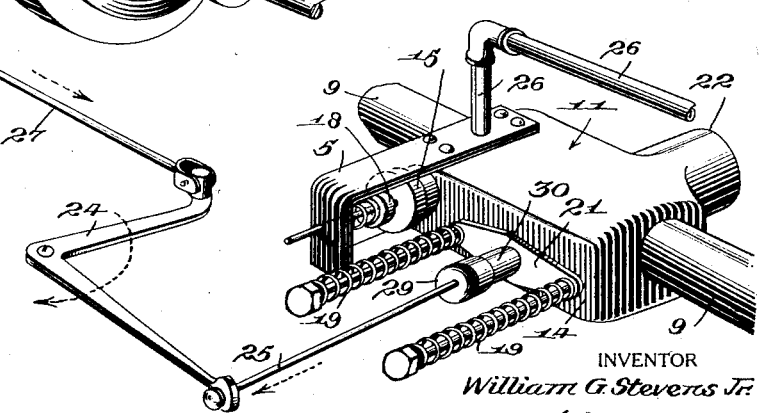

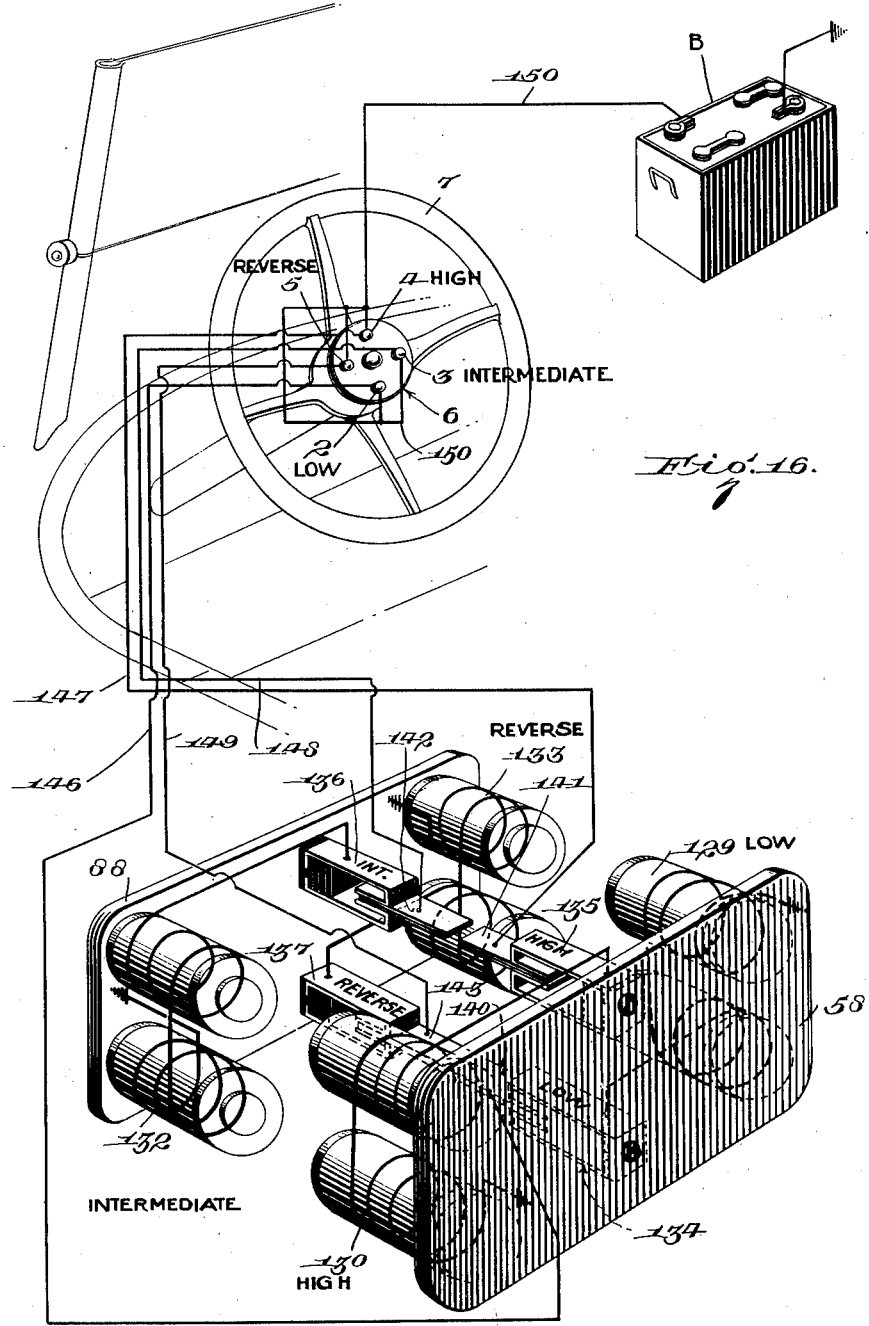

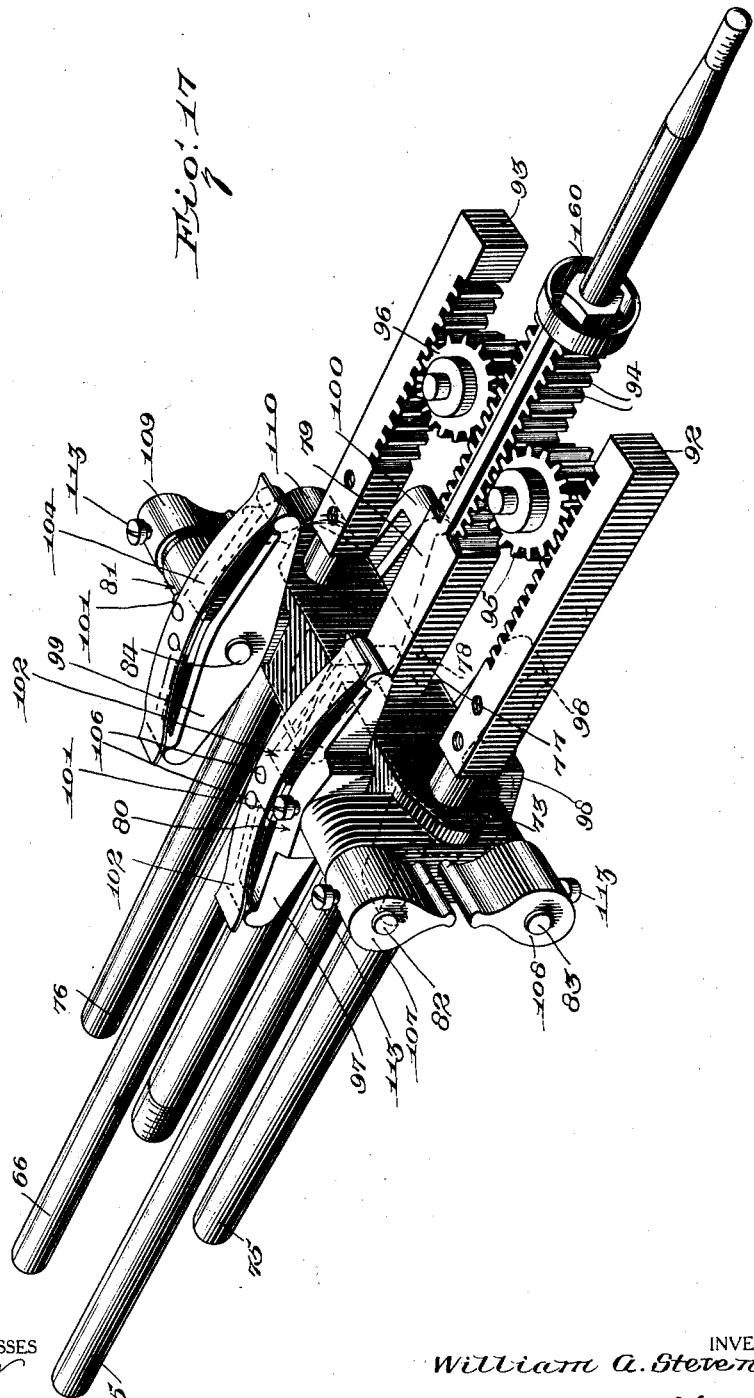

Patented Aug. 24, 1926.

1,597,253

UNITED STATES PATENT OFFICE.

WILLIAM G. STEVENS, JR., OF NEW YORK, N. Y.

GEAR SHIFTER.

Application filed July 23, 1925. Serial No. 45,685.

This invention relates to improvements in gear shifters for motor vehicles, and it consists of the constructions, combinations and arrangements herein described and claimed.

An object of the invention is to provide a gear shifting mechanism which is almost solely actuated by the exhaust gas of the motor, certain steps in the operation being accomplished by brief use of electricity, all of the functions of the speed changing mechanism being controlled by a brief pressure upon control buttons accompanied by depression of the clutch pedal.

Another object of the invention is to provide a gear shifting mechanism for motor vehicles, utilizing exhaust gas or other fluid pressure to first neutralize the transmission gears and then shift them to the proper combination in order to obtain desired results.

A further object of the invention is to provide in the exhaust gas conduit a pressure valve by means of which an approximately constant pressure is maintained for the operation of the gear shifting mechanism regardless of the volume of exhaust gas discharged by the motor.

A further object of the invention is to provide quick-acting instrumentalities to obtain any desired combination of the transmission gears, under any given conditions, by simply actuating a push button and subsequently depressing the clutch pedal.

A further object of the invention is to provide a remote-control for gear shifting mechanism, whereby relatively small push buttons, located upon the steering wheel are used to select various circuits, or sections of circuits for the ultimate production of the desired gear shifting, the completion, however, of the selected circuit being dependent on the gear shifting mechanism itself, said mechanism coacting to make and break the particular circuit at the proper time.

A further object of the invention is to provide gear shifting mechanism, the fundamental operating principle of which insures that the driving clutch is always released in order that the engine may be disconnected from the transmission gearing while the gear shifting mechanism is in operation.

A further object of the invention is to provide mechanism for the purposes described to be operated by fluid under pressure, said mechanism containing few and simple parts when compared with the functions that are to be performed, the parts being readily accessible and easy to repair.

A further object of the invention resides in the ability to operate gear shifting mechanism by a lever that is carried in the tool box and made use of in the event that the fluid pressure actuated mechanism or parts of the electrically controlled mechanism may fail to operate.

Other objects and advantages will appear in the following specification, reference being had to the accompanying drawings, in which Figure 1 is a plan view of the chassis of a motor vehicle showing the invention applied.

Figure 6 is a horizontal section, the mechanism in both Figures 5 and 6 being in the neutral position and agreeing with Figure 2.

Figure 7 is a side elevation of the gear shifting mechanism.

Figure 8 is a detail longitudinal section on the line 8—8 of Figure 5 illustrating the relatively fixed and movable contacts of the gear shift mechanism which cooperate with the electrical control of Figure 16.

Figure 9 is a detail horizontal section on the line 9—9 of Figure 5 illustrating the electro-magnetic controlling means.

Figure 10 is a cross section on the line 10—10 of Figure 5 for particularly illustrating the bearings of the rack gears.

Figure 11 is a cross section on the line 11—11 of Figure 5 illustrating the mountings of the aforesaid shifting latches.

Figure 12 is a cross section on the line 12—12 of Figure 5, illustrating the bumper spring casing.

Figure 13 is a diagram illustrating the latches and the electro-magnets on one side when the shifting mechanism is in the neutral position as in Figure 2.

Figure 14 is a similar diagram illustrating the action of the latches and electro-magnets while beginning to shift from neutral to 1st.

Figure 15 is a similar diagram showing the position of the latches and electro-magnets when being shifted from neutral to 1st as in Figure 3.

Figure 16 is a diagram of the electrical control.

Figure 17 is a detail perspective view showing the elements of the automatic mechanism that is connected directly to the shift rods.

Figure 18 is a diagrammatic perspective view showing the relationship of the clutch and clutch pedal to the automatic gas valve.

In considering the invention as herein disclosed, reference may be had to my United States patent on gear shifters granted May 23, 1922, #1,417,213. The present invention is an improvement on the structure in the patent, and while the fundamental principles are the same in both instances, the improvements embody a simplification in construction and provide a mechanism that is more efficient for the purpose intended.

The general purpose of the invention is to provide a mechanism to shift the gears in the transmission case of motor vehicles. The use of transmission mechanism is a necessary adjunct to the internal combustion motor, it being the instrumentality by which the substantially constant speed of the motor is divided into a number of speeds at the propeller shaft of the vehicle. The conventionally adopted division of speeds is three speeds forward and one speed reverse.

To accomplish the change from one speed to another use is made of the familiar gear shift lever, the proper manipulation of which becomes an important item in the operation of a motor vehicle. The clutch pedal must always be depressed prior to a gear shift in order that the engine may be disconnected from the transmission mechanism during the interval of the shift. The shifting of the speed change lever requires some manual effort and dexterity. According to the improvement the gear shift control is confined to the clutch pedal 1 and four electrical buttons 2, 3, 4 and 5 mounted in the most convenient location in front of the operator, preferably, in an appropriate place in the center of the steering wheel 7. These buttons, in the order given, cause gear shifts to 1st, 2nd, 3rd and reverse.

Figure 1:
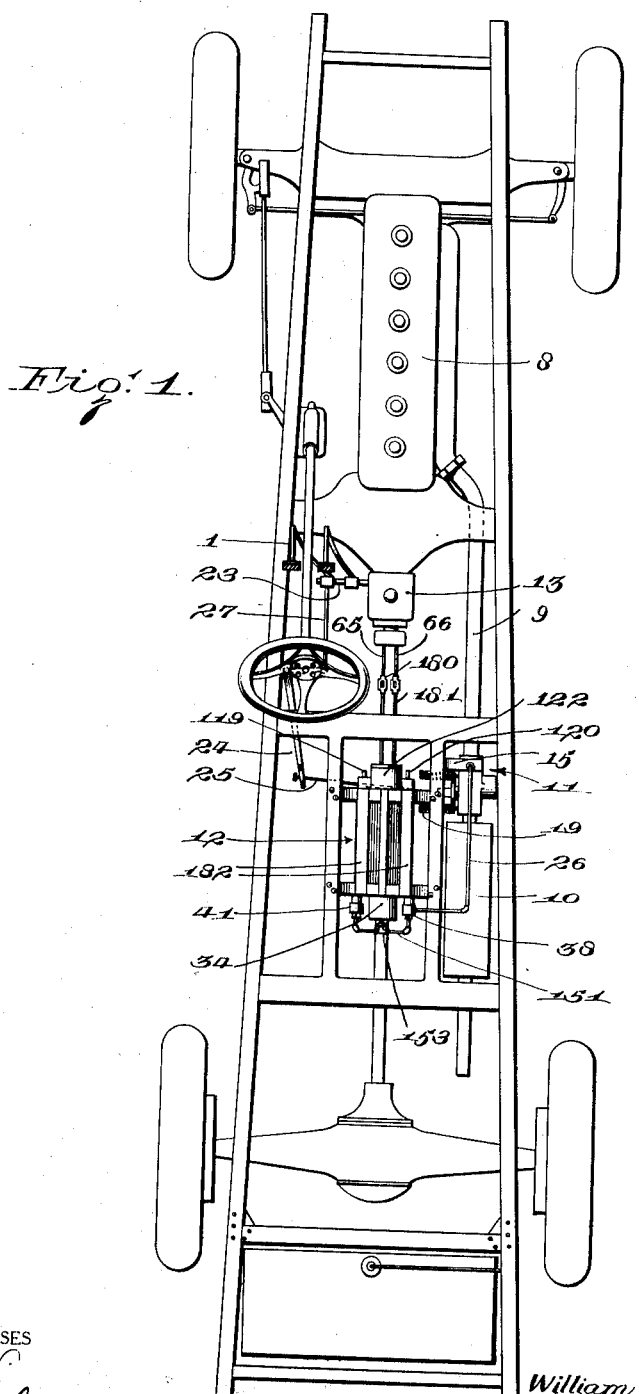

In Figure 1 the exhaust of the engine 8 passes through a conduit 9 on its way to the muffler 10 and to atmosphere, but for the purposes of the invention is capable of being diverted from the muffler by a mechanism generally designated the automatic gas valve 11. The gas thus diverted becomes the medium for actuating the gear shift mechanism in the casing 12. The important functions of this mechanism are under the control of the electrical system in Figure 16, and the combined operations of the gear shift mechanism and the electrical control results in various gear shifts in the transmission mechanism housing 13.

The automatic gas valve 11 comprises a casing 14 which in one part has an automatically acting pressure valve 15 and in another part has a valve 16 capable of being unseated from its normal position across the conduit 9 by foot pressure upon the clutch pedal 1. The tension of the spring 17 is capable of regulation by the adjustment of a collar 18 so that it requires a variable amount of pressure before gas from the conduit 9 will unseat the valve 15. Springs 19, guided upon bolts 20, tend to depress the yoke 21 and normally displace the valve 16 into the chamber 22 of the casing 14, so as to open the conduit 9 for the escape of the exhaust gas to the muffler 10. Upon depression of the clutch pedal 1 from position A to position B the resulting rocking of the shaft 23 and bell-crank 24 (Figs. 4 and 18) causes an outward pull on the connection 25 (a flexible rod or the like) so that the valve 16 is drawn to the seating position across the conduit 9 (Figs. 3 and 4) whereupon gas is diverted from the conduit 9 into the pipe 26. Connection is made between the bell-crank 24 and the clutch pedal 1 by a link 27 (Fig. 18). The connection 25 terminates in a head 28 (Figs. 3 and 4) which bears against a spring 29 in the casing 30. The arrangement permits necessary yielding, should the operator press harder than is ordinarily required for the seating of the valve 16. The valve rod 31 carries a plug 32 to engage a seat 33 to prevent gas leakage when the valve 16 is retracted within the chamber 22.

The gear shift mechanism comprises the cylinder 34 into which exhaust gas is admitted at one or the other side of the piston 35 upon diversion from the conduit 9 by seating of the valve 16 and dependent on whether the double plugs 36 and 37 of the intake valve 38 are seated at 39 or 40. An outlet valve 41 coacts with the intake valve 38, and the escape of spent exhaust gas at one or the other of a pair of sets of openings 42 and 43 depends on whether the double plugs 44 and 45 are seated at 46 or 47.

Figure 4:
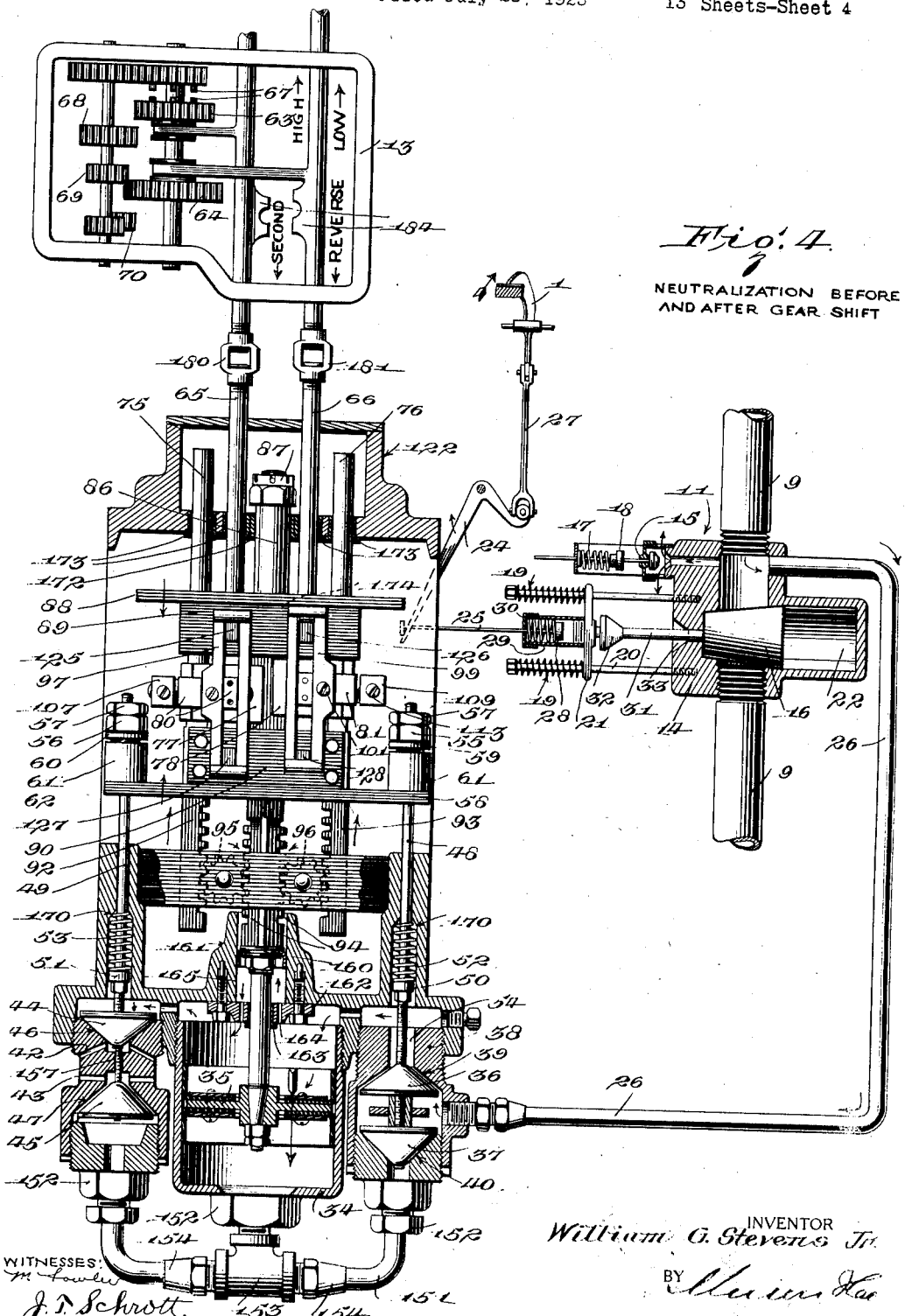
Figure 4 is a diagrammatic sectional view illustrating step two in which the gears are neutralized preparatory to the next gear shift.

The variation in the seating of the double plugs of the valves 38 and 41 is the result of a double control to which they are subject. The stems 48 and 49 of the respective valves carry adjustable collars 50 and 51 against which springs 52 and 53 act to tend to seat the plugs 37 and 44 at 40 and 46 (Fig. 4). The companion plugs 36 and 45 are then unseated, the first holding open the passage 54 for a subsequent introduction of gas into the cylinder 34 at the forward side of the piston 35, the latter holding open the openings or ports 43 for the escape of spent gas as the piston moves backward.

Figure 2:
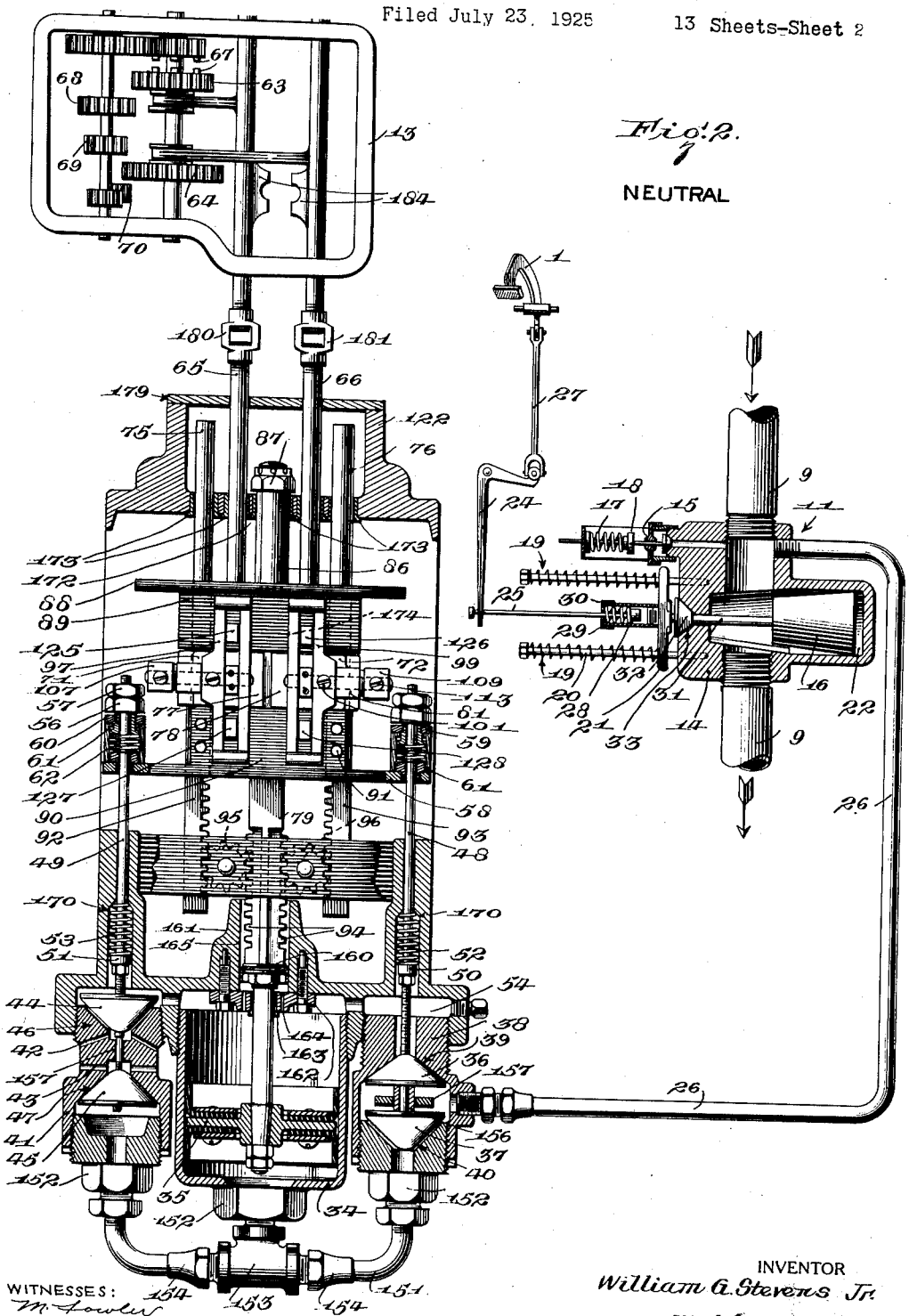
Figure 2 is a sectional diagram showing the mechanism and gears in the neutral position.
Figure 5:
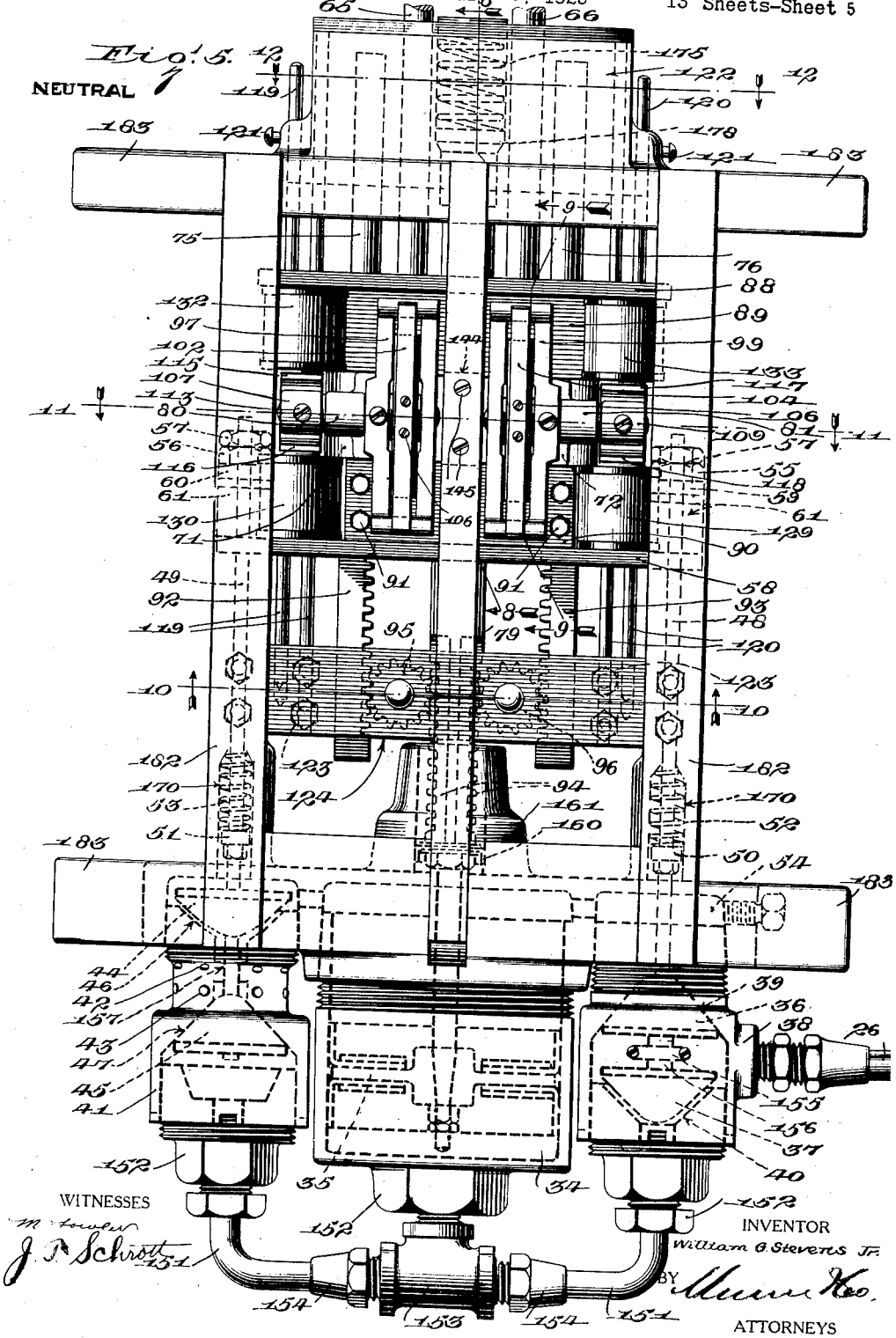
Figure 5 is a plan view of the gear-shifting mechanism.

The foregoing position of the plugs in the intake and outlet valves 38 and 41 (Fig. 4) is regarded as normal during the actual accomplishment of a gear shift. The spring control of the valve plugs therefore asserts itself after a gear shift has produced an actual speed change. The second control occurs when the gears have been shifted to the neutral position (Figs. 2 and 5).

Each of the valve stems 48 and 49 carries abutment nuts 55 and 56 held in place by lock nuts 57. The rear plate 58 upon moving forwardly, as it does preparatory to the neutralizing action, brings the bumpers 59 and 60 up behind the nuts 55 and 56, carrying the valve stems 48 and 49 along until the plugs 36 and 45 are seated at 39 and 47 (Figs. 2, 3, 5 and 6). The bumpers have limited movement in respect to the containing cases 61 in which the springs 62 act upon the bumpers in such a manner as to permit any necessary yielding after the valve heads are seated as stated.

Figure 3:
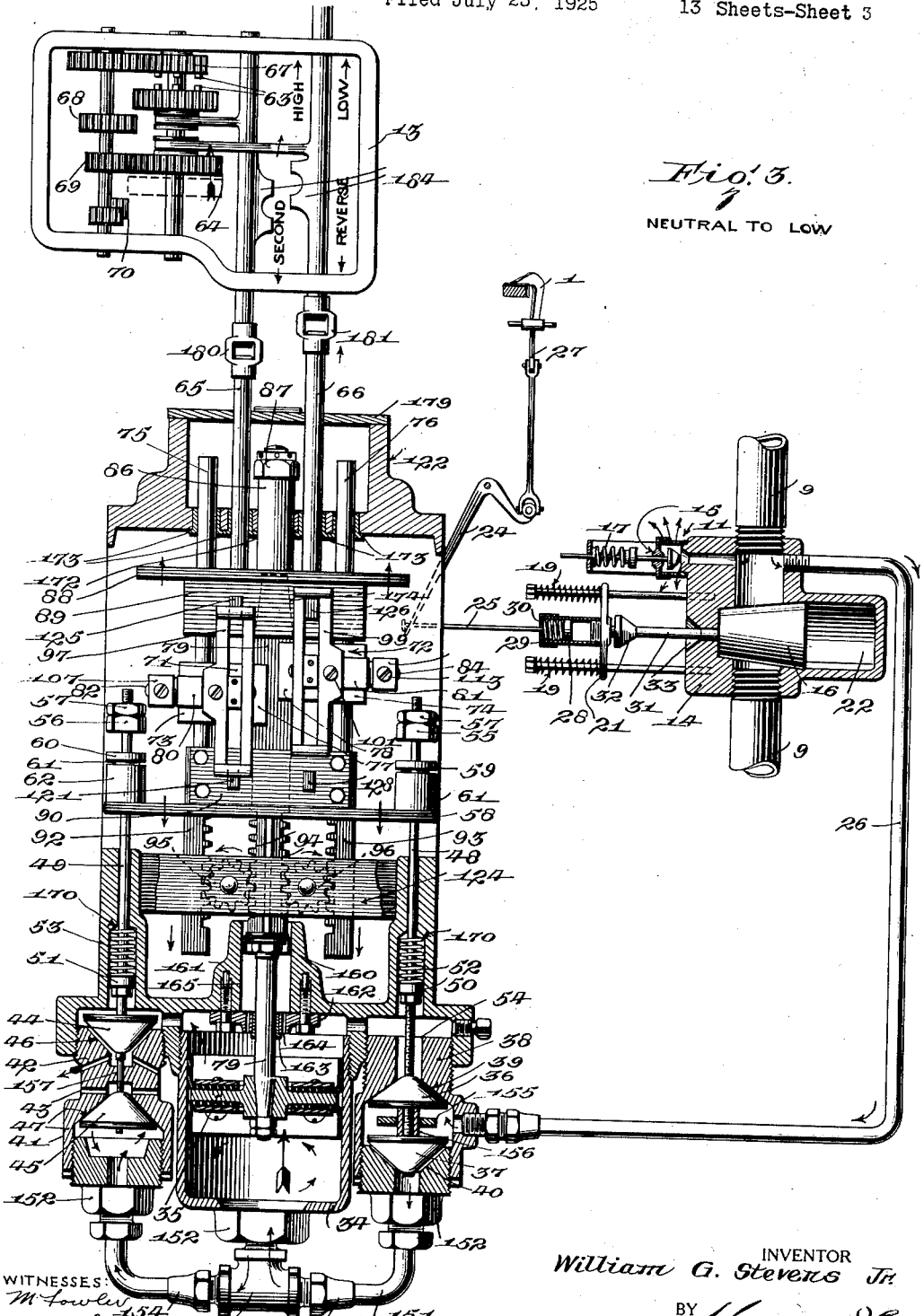
Figure 3 is a sectional diagram illustrating step one of the act of shifting from neutral to low or first.

Prior mention of the shifting and neutralization of gears requires the naming of the gears in the transmission housing 13. The gears 63 and 64 are slidable by shift rods 65 and 66 respectively to make engagement at the dogs 67 for high speed or mesh with the gear 68 for second speed, or mesh with the gear 69 for first speed or with the idler 70 for reverse. The first speed position is shown in Figure 3, and the neutral position in Figures 2, 5 and 6. The shift rods extend into the casing 12 wherein the extremities are permanently secured to shift blocks 71 and 72 (Figs. 6, 9 and 11). Lateral bosses 73 and 74 on these blocks provide guides in which rack rods 75 and 76 are slidable. Inward extensions 77 and 78 of the blocks combine to form a saddle by which the non-circular end of the piston rod 79 is received and guided (Fig. 11). Upright extensions 80 and 81 provide supports in which pairs of stud shafts 82, 83 and 84, 85 (Fig. 11) have bearing. Only a slight rocking motion is required of these stud shafts.

It is only a part of the piston rod 79 that is non-circular (square), the rear and front end extremities being round. The rear end carries the piston 35. The front end carries a sleeve 86 through the end of which a nut 87 assists in holding the front plate 88 in position. The front plate and a piston block 89 are fixed to move with the piston rod 79. The formerly mentioned rear plate 58 and rack block 90 are fixed at 91 to move with the rack rods 75 and 76 which, as the name implies, have racks 92 and 93. The piston and rack blocks 89 and 90 constitute movable elements to which the foregoing shift blocks 71 and 72 are capable of being coupled in producing gear shifts. The square part of the piston rod has racks 94 facing the racks of the rods.

Rack pinions 95 and 96 are interposed between the various racks. A forward motion of the piston and piston rod (Fig. 3) causes counter-clockwise movement of the pinion 95 and clockwise movement of the pinion 96 so that both rack rods 75 and 76 are drawn rearwardly. As stated, the blocks 89 and 90 are respectively connected with the piston rod 79 and rack rods 75 and 76 and the blocks therefore separate by reason of the opposite movement of the rods. It is in this act that the gear 64 is moved from neutral position (Fig. 2) to the first speed position at the gear 69. A rearward motion of the piston 35 and piston rod 79 (Fig. 4) causes a clockwise rotation of the pinion 95 and a counter-clockwise rotation of the pinion 96 so that the rack rods 75 and 76 move forwardly. The blocks 89 and 90 being connected will approach each other to the ultimate position in Figures 2, 5 and 6. It is this act that produces neutralization of the gears in the transmission housing 13 either permanently or preparatory to a gear shift to another speed.

Latches 97, 98, 99 and 100 are fixed to the respective stud shafts 82, 83, 84 and 85 by set screws 101. These latches are open, rectangular bodies through which the upright extensions 80 and 81 pass sufficiently far to carry springs 102, 103, 104 and 105. The springs are secured to the uprights by screws at 106. The springs are for the purpose of keeping the respective latches in a normally horizontal position (Figs. 7, 8, 9 and 13). There are four of the latches, and an equal number of the springs.

Rocking motion of the stud shafts and attached latches occurs upon operation of arms 107, 108, 109 and 110 upon motion of armature blocks 111 or 112 either forwardly or rearwardly. The arms are affixed to the respective stud shafts by screws 113.

Pairs of the rocker arms, for example 109 and 110 (Figs. 11, 13, 14 and 15) stand in upright, opposed relationship so that each pair is capable of simultaneous rocking motion upon movement of the respective armature block. The block 112, for example, has grooves 114 into which the ends of the opposed arms extend. Each block fixedly carries pairs of armatures 115, 116 and 117, 118, any one of which is subject to electro-magnetic attraction to shift the attached block and produce the rocking motion mentioned. The movable electro-magnets slide either forwardly or rearwardly to rotate the rocker arms and do not attract or do not move the adjacent armature through a distance by means of a magnetizing force. Shifting of the armature blocks 111 and 112 occurs upon pairs of slide rods 119 and 120. The outer ones of the pairs of rods are secured at 121 to a part of the front-casting bumper spring casing 122 (Figs. 5 and 6) the inner ones being secured at 123 (Fig. 10) to the bridge 124 upon which the rack pinions are journaled.

Situated in pairs above and below the piston block 89 are lugs 125 and 126. Similarly situated above and below the rack block 90 are pairs of lugs 127, 128. These various lugs are fixtures upon the respective blocks. Each pair coact with the adjacent ends of the pairs of latches for one or the other of the pairs of latches for the purpose of establishing a connection of either the shift block 71 or 72 with either the piston block 89 or rack block 90. For example, appropriate rocking of the stud shafts 84 and 85 (Figs. 7 and 13) will move the latches 99 and 100 into engagement with the pair of lugs 126 (Fig. 14) thereby establishing a connection of the shift block 72 with the piston block 89 whereby the latter on its forward movement carries the shift block 72 correspondingly forward so that the rod 66 shifts the gear 64 into engagement with the low gear 69 (Fig. 3).

The electrical control comprises electro-magnets 129, 130, 133 and 132 (Fig. 16) which, in the order given, hold the adjacent armatures previously mentioned preparatory to the establishment of the 1st, third, second and reverse gear shifts. Each of the electro-magnets is arranged in pairs, and in the order given are intended to hold the armatures 118, 116, 115 and 117. The electro-magnets do not attract the various armatures in the sense that the armatures are drawn thereto through a distance but are simply intended to hold the armatures so that the armature blocks 111 and 112 are slid either forwardly or rearwardly upon the slide rods together with the blocks 89 or 90.

The electro-magnets 129 and 130 are mounted upon the rear plate 58. The electro-magnets 132 and 133 are mounted upon the front plate 88. One terminal of the winding of each electro-magnet is suitably attached to the respective plate (Fig. 16) which therefore becomes the ground connection. The opposite terminals of the electro-magnets in the order given, are connected to contacts 134, 135, 136 and 137. These contacts are herein known as movable. They are fixedly connected at 138 to an adjacent plate, but insulated therefrom at 139.

They coact with contacts 140, 141, 142 and 143. The latter contacts are secured in confronting location upon blocks of insulation 144 permanently secured at 145 to the casing 12. The contacts last mentioned are herein known as stationary, and in the order given, are associated with the 1st, 3rd, 2nd and reverse gear shifts.

Electrical connections are made with the switch case 6 on the steering wheel 7 in this manner: The wire 146 connects one contact of the 1st speed button 2 with the stationary contact 140, a wire 147 connects one contact of the 3rd speed button 4 with the stationary contact 141. A wire 148 connects one contact of the 2nd speed button 3 with the stationary contact 142 and a wire 149 connects one contact of the reverse speed button 5 with the stationary contact 143. The remaining contacts of the buttons have a common connection 150 with the positive pole of the storage battery B. The negative pole of the battery is grounded.

The following shifts are illustrative of the operation of the various mechanisms:

(1) Operation of gear shift from neutral to 1st.

(2) Operation of gear shift from 1st to 2nd.

(3) Operation of gear shift from 2nd to 3rd.

(4) Operation of gear shift from neutral to reverse.

(5) Operation of gear shift from 1st to reverse.

(6) Operation of gear shift from reverse to 1st.

(7) Operation of gear shift to neutralize from any position.

All of these operations are controlled by the electrical apparatus in Figure 16. Although the actual power required cannot be had until the operator steps upon the clutch pedal 1, the electrical apparatus, nevertheless, does the actual controlling. To step upon the clutch pedal 1 alone results in neutralizing the gears (Figs. 2, 5 and 6), and in this connection it is to be noted that there are four possible positions of the clutch pedal, to wit: Position A constitutes the normal position of the clutch pedal, position B the driving clutch is fully disengaged, position C plug 16 begins to seat and diversion of gas into the feed pipe 26 commences, position D end of the clutch pedal stroke.

*Operation of gear shift from neutral to first.*

Assume the gear shifter to be in the neutral position (Figs. 2, 5 and 6). The piston 35 is in the rearmost position in the cylinder 34. The piston and rack blocks 89 and 90 are closest together and have therefore, using the analogy of the vise, clamped the blocks 71 and 72 into the central position at which time the slidable gears 63 and 64 (Fig. 2) are in neutral position in respect to the companion gears.

The rear plate 58, now being as far forward as it ever goes, has brought the bumpers 59 and 60 up behind the abutment nuts 55 and 56 on the stems 48 and 49 so that the intake plug 36 is forcibly seated at 39 and the outlet plug 45 is forcibly seated at 47. The diverting valve 16 normally occupies the chamber 22 (Fig. 2) so that exhaust gas passes through to the muffler 10, and out to atmosphere.

Depress the button 2. Current flows from the positive pole of battery B over wire 150 past the contacts of button 2, over wire 146 to the stationary contact 140, through the movable contact 134 to the electro-magnet 129 whence it returns the ground connection at the negative pole of the battery via plate 58 and the metallic framework. It is to be remembered that all movable and stationary contacts (Fig. 16) are in engagement when the gear shifter is in the neutral position (Figs. 2, 5 and 6). The energization of the electro-magnet 129 holds the armature 118 (Fig. 13). It is to be remembered that each of the four armatures is in contact with the cores of the adjacent electro-magnets, while the gear shifter is neutral (Figs. 7 and 13). The function of any electro-magnet is therefore to hold the adjacent armature.

Depress the clutch pedal 1 to position B. The diverting valve 16 is drawn to the position in Figure 3. Gas is diverted from the conduit 9 into the feed pipe 26, any surplus gas escaping to atmosphere at the gas valve 15 which automatically unseats for the purpose. Gas passes from the pipe 26 behind the unseated plug 37 of the intake valve 38 to the rear of the piston 35. The plug 45 being seated prevents the escape of the useful gas at the ports 43.

The piston 35 now moves forwardly under the pressure of gas behind it. The piston block 89 also moves forwardly, being attached to the piston rod 79. The rack block 90 moves rearwardly, being carried by the racks 92 and 93. The racks are actuated by the rack faces 94 of the piston rod through pinions 95 and 96. The opposite directions of movement of the blocks 89 and 90 are designated by arrows $a$ in Figure 14.

Prevailing energization of the electro-magnet 129 with the resulting hold upon the armature 118, and the rearward movement of this electro-magnet with the block 90 causes turning of the stud shafts 84 and 85 in the direction of the arrows (Fig. 14) with a resulting rocking of the latches 99 and 100 so that they engage the lugs 126 above and below the piston block 89. The engaging action occurs instantly upon opposite motion of the blocks.

Continued forward movement of the piston block 89 carries the latches 99 and 100 with it. The latches are mounted upon the shift block 72, and the shift block is carried forwardly with the latches. The shift block is attached to the shift rod 66, and the shift rod is therefore moved forwardly, and by virtue of the fact that gear 64 is slid from the neutral position in Figure 2 to the 1st speed position in Figure 3. The action of the piston block 89 upon the shift rod 66 is that of a pull. Residual gas in the cylinder 34 in front of the piston 35 is expelled at the ports 42 past the unseated plug 44.

The 1st gear shift has been completed. The operator releases the clutch pedal 1 and the switch button 2. The gear shifter and parts assume the positions in Figures 3, 4 and 15, and if no other act is performed by the operator the vehicle will run in low gear. Release of the pedal 1 permits the reopening of the diverting valve 16 (Fig. 2) so that the exhaust gas passes out to atmosphere and pressure in the cylinder 34 drops instantly.

Up to the instant of the pressure drop the plugs 36 and 45 were held in the position in Figure 3 by the pressure of gas. These valve plugs have associated springs 52 and 53 that tend to move the plugs to the opposite positions. Upon the drop in pressure these springs act to move the plugs to the opposite positions so that they then assume the position in Figure 4. The intake and outlet valves 38 and 41 are then in position for the neutralizing act which precedes the next gear shift. Refer to Figures 14 and 15. As soon as the latches 99 and 100 clutch upon the lugs 126 the armature 118 is forcibly torn away from the still energized electro-magnet 129 in the interim between Figures 14 and 15. The electro-magnet 129 is not deenergized until the movable contact 134 becomes disconnected from the stationary contact 140 when the blocks 89 and 90 become sufficiently separated.

*Operation of gear shift from 1st to 2nd.*

The gear shifter is in the position in Figure 4. The transmission gears are in the position in Figure 3. Step upon the clutch pedal 1 and push the button 3 (Fig. 16). Gas is diverted from the conduit 9 into the feed pipe 26 whence it passes around the unseated plug 36 of the intake valve 38, through passage 54 and into the forward end of the cylinder 34. The resulting rearward movement of the piston 35 (see arrow, Fig. 4) expels residual gas from the rear end of the cylinder through the ports 43 adjacent to the unseated plug 45 of the outlet valve 41. Rearward movement of the piston is accompanied by rearward movement of the piston block 89 which is attached to the piston rod 79. Forward movement of the racks 92 and 93 results from the turning of the pinions 95 and 96 (see arrows, Fig. 4). The block 90 moves forwardly, being attached to the rack rods.

The resulting closing or clamping action of the blocks 89 and 90 moves the shift blocks 71 and 72 to the neutral position (Figs. 2, 5 and 6), but inasmuch as the shift block 71 is already in the neutral position, it is only the block 72 that is affected. The block 89 engages the shift block 72 and moves it rearwardly into line with the block 71 by which act the shift rod 66 pulls the gear 64 back into the original disengaged or neutral position (Fig. 2).

It is then that the electrical circuit of the button 3 is completed. The operator still has his finger upon the button. Current now flows from the positive pole of the battery B over wire 150 past the engaging contacts of the button 3, over wire 148 to the stationary contact 142, through the movable contact 136 and electro-magnet 132 to ground whence it is returned to the negative pole of the battery. Regardless of the fact that the operator depresses the button 3 substantially simultaneously with the depression of the clutch pedal 1 the foregoing circuit is not completed until the rearward and neutralizing action of the piston 35 brought the contacts 142 and 136 together. The electro-magnet 132 is energized and holds the armature 115.

No sooner does the piston 35 complete its rearward stroke to neutralize the gears than do the bumpers 59 and 60 pull forwardly upon the stems 48 and 49 to reverse the positions of the valves 38 and 41 from those in Figure 4 to those in Figures 5 and 6. The bumpers 59 and 60 act on the forward movement of the rack block 90.

The operator still has his foot upon the clutch pedal 1. The diverted gas now passes to the rear of the piston 35 moving it forwardly. The electrically held armature 115 also moves forwardly with the energized electro-magnet 132. The armature block 111 rocks the inner extremities of the arms 107 and 108 forwardly, turning the stud shafts 82 and 83 in counterclockwise and clockwise directions respectively and causing the left ends of the latches 97 and 98 to close upon the lugs 127.

The rearward movement of the rack block 90 now carries the projected latches 97 and 98 and shift block 71 with it. The shift block being attached to the shift rod 65 carries the gear 63 (Fig. 3) with it, until the second speed gear 68 is engaged. The shift to 2nd speed has been accomplished. The separation of the blocks 89 and 90 opens the circuit of the button 3 at the contacts 136 and 142 (Fig. 16). The operator releases the clutch pedal 1. The piston 35 is in the forward position where it remains until the next operation. The pressure of gas being discontinued upon the plugs of the intake and outlet valves 38 and 41 enables the springs 52 and 53 to seat the valve plugs as in Figure 4.

*Operation of the gear shift from 2nd to 3rd.*

Step upon the clutch pedal 1 and depress the button 4. Gas is again diverted into the feed pipe 26 whence it flows through the passage 54 to the forward end of the cylinder 34, moving the piston 35 rearwardly. The block 89 moves rearwardly, and the block 90 forwardly. The block 71, being in the rearward position is the only one of the two affected in the initial neutralizing action. This is accompanied by a reversal of the valves 38 and 41. The forward movement of the bumpers 59 and 60 shift the valve plugs into the position in Figure 3, whereupon the gas then acts on the rear side of the piston and again pushes it forwardly. The blocks 89 and 90 again become separated.

But as soon as these blocks were brought together in the neutralizing action, the circuit of the push button 4 was completed thus: Current flows from the positive pole of battery B (Fig. 16) over wire 150 through the engaging contact of the button 4, over wire 147 to the stationary contact 141, through movable contact 135 and electro-magnet 130 to ground, whence it returned to the negative pole of the battery. The resulting energization of the electro-magnet 130 holds the armature 116.

The subsequent rearward movement of the block 90 causes the arms 107 and 108 to swing rearwardly with the armature block 111, causing the latches 97 and 98 to rock toward each other at the forward ends so that the lugs 125 become engaged. The forward movement of the block 89 then causes the shift block 71 to move forwardly by virtue of the connection. The shift block being connected to the piston rod 65 causes it to move forwardly so that the dogs 67 (Fig. 3) are brought into engagement for a direct drive by the engine shaft. The shift to 3rd or high-speed has been accomplished. The operator releases the clutch pedal 1. He also releases the button 4, but the electrical circuit of the button was broken independently of the button when the blocks 89 and 90 became separated. The piston 35 is again in the forward position, and the intake and outlet valve plugs are disposed as in Figure 4.

*Operation of gear shift from neutral to reverse.*

Assume the gear shifter and gears to be in the neutral position (Fig. 2). The concomitant position of the piston 35 is that at the rear end of the cylinder 34. The plugs of the intake and outlet valves 38 and 41 are positioned as shown (see also Figs. 5 and 6). Step upon the clutch pedal 1 (Fig. 18) and press the reverse button 5 (Fig. 16). The contacts 137 and 143 (as well as all other contacts) are in engagement by virtue of the fact that the blocks 89 and 90 are closed. Current then flows from the positive pole of the battery B over wire 150 through the engaging contacts of the button 5, over wire 149, past contacts 143 and 137 to the electro-magnet 133 whence it returns to the negative pole of the battery via the ground connections.

Movement of the blocks 89 and 90 in opposite directions, by virtue of the entrance of gas into the cylinder 34 behind the piston 35 causes the energized electro-magnet 133 to carry the armature 117 and armature block 112 with it. The adjacent ends of the arms 109 and 110 are rocked forwardly causing the left ends of the latches 99 and 100 to swing inwardly toward each other and close upon the lugs 128. The rearward movement of the block 90 carries the shift block 72 rearwardly by virtue of the latch connection. The shift block being attached to the shift rod 66 carries that rod rearwardly, and as a result slides the gear 64 into engagement with the reverse idler 70 (Fig. 3). The shift to reverse speed has been accomplished. The operator releases both the pedal 1 and the button 5, but it must be remembered that the circuit completed at any of the buttons is automatically broken upon separation of the blocks 89 and 90 whether the particular button be released or not. The piston 35 is now in the rearmost position. The springs 52 and 53 act to seat the valve plugs 37 and 44 as in Figure 4.

*Operation of gear shift from 1st to reverse.*

It frequently happens that a necessity arises in operating motor vehicles to shift from 1st to reverse, for example, when maneuvering into and out of a parking space. The gears 64 and 69 are in mesh as in Figure 3. The piston 35 and the plugs of intake and outlet valves 36 and 41 are as in Figure 4. The operator steps upon the clutch pedal 1 but depresses it only to position B (Fig. 18). This fully disengages the driving clutch but does not affect the gear shifter. The brake is applied and the vehicle brought to a stop. Depress the button 5 (Fig. 13). Complete the depression of clutch pedal 1. The resulting diversion of exhaust gas into the feed pipe 26 by virtue of the closure of the valve 16 causes the piston 35 to travel rearwardly (Fig. 4). The blocks 89 and 90 are closed in upon the shift blocks 71 and 72, neutralizing them and the transmission gears (Fig. 2). But this act of the blocks also engages all contacts in Figure 16 so that the following circuit is completed: Current flows from the positive pole of the battery B over wire 150 through the closed contacts of button 5, over wire 149, past contacts 143 and 137 to the electro-magnet 133 whence it returns to the negative pole of the battery via the ground connections.

No sooner has the piston 35 reached the rearmost position than the plugs of the valves 38 and 41 will have shifted from the positions in Figure 4 to that in Fig. 3. This is accomplished by the arrangement of the bumpers 59 and 60 on the closing movement of the block 90. The gas thus diverted, presses the piston 35 forwardly, again separating the blocks 89 and 90. But in doing so, the shift block 72 is carried rearwardly with the block 90, because the electro-magnetic holding of the armature 117 (Fig. 7) caused the left ends of the latches 99 and 100 to rock inwardly toward each other and engage the lugs 128. The connection thus established permits the block 90 to pull the shift rod rearwardly and thereby to slide the gear 64 (Fig. 3) into engagement with the reverse idler 70. The gear shift from 1st speed to reverse has been accomplished. The operator releases the clutch pedal 1 and the button 5.

*Operation of gear shift from reverse to first.*

This gear shift follows the one previously described, and is part of the maneuver spoken of. The clutch pedal 1 is again depressed and the vehicle brake is applied. The piston 35 stands in the forward position as a result of the preceding operation. The plugs of valves 38 and 41 stand as shown in Figure 4.

Depress clutch pedal 1 to the end of the stroke, and press button 2 (Fig. 13). Gas is admitted ahead of the piston 35 (Fig. 4) driving the piston 35 rearwardly, and bringing the blocks 89 and 90 together into the neutral position (Figs. 2, 5 and 6). The resulting engagement of contacts 134 and 140 closes the following circuit: Current flows from the positive pole of the battery B over wire 150 past the engaging contacts of button 2, over wire 146, past contacts 140 and 134 to the electro-magnet 129 whence it returns to the negative pole of the battery via the ground connection.

As soon as the piston 35 reaches the rear end of its stroke the valves 38 and 41 become reversed by the action of the bumpers 59 and 60 on the respective ground stems, so that gas is now directed to the rear of the piston 35 forcing it forwardly and again separating the blocks 89 and 90. Energization of the electro-magnet 129 causes the engagement of the latches 99 and 100 with lugs 126 in a manner already understood, whereupon the forward movement of the block 89 carries the shift block 72 forwardly and causes the gear 64 to again slide into mesh with the low or first speed gear 69. This particular shift is thereby accomplished, and the operator releases both the pedal 1 and button 2.

*Operation of gear shift to neutral from any position.*

This particular act does not involve the use of the push buttons in Figure 16 or any of the associated electrical apparatus. The neutralizing action of the gear shifter precedes any gear shift. This is already evident from the foregoing description. All that the operator has to do is to depress the clutch pedal 1 all the way.

At each of the foregoing gear shifts the piston 35 remains at the forward extremity of its strokes. The blocks 89 and 90 are therefore left separated after a gear shift has been accomplished. The result of stepping on the clutch pedal 1 therefore, is to admit gas into the cylinder 34 ahead of the piston 35 (Fig. 4) whereupon the piston is driven rearwardly and the blocks 89 and 90 are closed upon the shift blocks 71 and 72, finally bringing them to the neutral position (Figs. 2, 5 and 6).

Details of construction not mentioned previously are now taken up to make the description complete. The automatic gas valve 15 and seat thereof are preferably of 45° bevel. The seat and valve are made of Monel metal or some other material that will not readily deteriorate under the action of the hot gas.

A pipe 151 constitutes the common connector between the rear ends of the intake and outlet valves 38 and 41 and the cylinder 34. The arrangement of the pipe may be as most convenient, packings 152, a T 153 and couplings 154 being employed in the drawings. A bridge 155 in the intake valve provides a guide for the plugs 36 and 37. The threaded portion of the valve stem 48 carries a sleeve 156 which slides in the bridge. The stem 49 of the other valve plugs 44 and 45 slide in a solid wall 157 which divides the front and rear portions of the outlet valve. The spring containers 61 and 62 are screwed upon the large ends 158 of plugs (Fig. 6) the reduced ends of which are screwed into the rear plates. The valve stems are guided in these plugs. The inturned ends of the containers retain and limit the bumpers 59 and 60.

In order to prevent the escape of gas from the front end of the cylinder 34 while the piston 35 moves rearwardly a small piston 160 is mounted upon the piston rod 79 at the place where the racks 94 end. The rear end casting 161 has a support 162 carrying a bearing bushing 163 in which the piston rod slides. The support has holes 164 admitting some gas to the chamber 165 which is occupied by the piston 160 thereby not only keeping the cup leather of the piston against the wall of the chamber but also permitting free passage back and forth of gas. The construction involved not only prevents the escape of gas from the main cylinder but also permits the ready removal of the main piston rod whenever the occasion requires.

A further purpose is served by the piston 160. The reader remembers that the neutralizing action occurs by admitting gas to the cylinder 34 in front of the piston 35. The gas pressure is exerted upon the piston 35 and piston 160 in opposite directions resulting in a slowing rearward movement. The force required to neutralize the transmission gearing is considerably less than the force required to shift the gears.

In shifting a gear, gas is admitted to the cylinder 34 at the rear of the piston 35. The full force of the gas is thereby exerted upon the piston 35. The action of the small piston 160 is that of a differential piston.

Bronze bushings 166 (Fig. 10) provide bearings for the trunnions 167 of the pinions 95 and 96. The bridge 124 is made in two parts (Fig. 10) to facilitate assembly. The upper part includes recesses 168 in which the racks 75 and 76 slide and by which they are kept in engagement with the respective pinions. The ends of the bridge 124 are secured upon forwardly extending portions of the rear end casting 161, these extensions 169 having passages for the valve stems 48 and 49 and containing chambers 170 by which the springs 52 and 53 are housed.

The sleeve 86 (Figs. 4 and 6) at one end extends into a recess 171 in the front plate and at the other end slides in a bushing 172 in the transverse wall of the bumper spring casing 122. This wall carries other bushings 173 in which the rods 65, 66, 75 and 76 (Figs. 3 and 6) slide. The nut 87 bears against the sleeve 86 and serves to hold the block 89 upon the piston rod 79. The block has a tapering opening 174 to receive a corresponding part of the piston rod.

Springs 175 and 176, arranged in pairs in appropriate chambers 177 in the casing 122 serve to absorb the shocks of impacts upon forward motion of the piston block 89. To this end the springs bear against plugs 178 which project rearwardly of the wall of the bumper casing. The opposite ends of the springs rest against a cover plate 179.

Turn buckles 180 and 181 (Figs. 1 and 3) situated in the shift rods 65 and 66 permit of such lengthening or shortening of the rods as will result in a proper adjustment of the slidable gears in respect to the gear shifter.

The front and rear castings 122 and 161 constitute the end supports of the gear shifter. These are connected by angle irons 182 (Figs. 10, 11 and 12). The members 122 and 161 have lateral lugs 183 by means of which the gear shifter is mounted upon the chassis of the motor vehicle. It is an obvious expedient to incase the gear shifter in such a manner that road dust, etc. will not enter to obstruct the mechanism.

In Figure 3 the shift rods are shown to have lateral depressions 184. These are for the purpose of permitting manual shifting of the rods in case the electrical or gas pressure controls should fail to function. It is intended that a suitable gear shift lever shall be carried in the tool box of the vehicle for the purpose of shifting the rods at the depressions mentioned.

I claim:—

1. The combination of an exhaust gas conduit, transmission gears, means actuated by the pressure of gas diverted from said conduit for shifting said gears to produce either a neutralization thereof or a change of speed, and a pair of pistons of different sizes and being the actuating elements of the aforesaid means, the action of the exhaust gas on one side of the large piston making available the full pressure to produce a gear shift for a speed change, the action of the gas on the opposite side of the large piston and upon the smaller piston resulting in a dispersion of pressure and a slower motion to shift said gears from neutralization.

2. The combination of transmission gears, gas pressure operated means to shift said gears to neutral position, said means including a cylinder, a piston movable in said cylinder by gas pressure to shift said gears and assuming a position at one end of the cylinder upon having neutralized the gears, a gas intake valve, and means operated by the piston when assuming said position to set the valve to admit gas to the cylinder to move the piston to the opposite position, which movement is utilized to produce a gear shift.

3. The combination of transmission gears, gas pressure operated means for the shifting of the gears, said means including a piston, a cylinder in which the piston is movable to produce various gear shifts, a valve to control the intake of gas into the cylinder, means actuated by the force of the piston when moving to one extremity of the cylinder during the gear shift to set the valve in such position as to be ready to admit gas into said extremity of the cylinder to move the piston in the opposite direction, and means including a spring to set the valve in another position so as to be ready to admit gas into the opposite end of the cylinder when the piston shall have been moved to said opposite end in the performance of another gear shift.

4. The combination of transmission gears, gas pressure operated means for shifting the gears, said means including a piston, a cylinder to which gas is admissible to move the piston, a double-plug valve for controlling the admission of gas, means actuated by the force of the piston when moving in one direction to perform a certain gear shift, thereby to unseat one of the plugs in readiness to admit gas into the cylinder for again moving the piston to perform another gear shift, and tension-operated means acting to unseat the other plug when the piston reaches the end of said second movement at which time said other gear shift has been performed thereby placing the valve in readiness to admit gas into the cylinder at the opposite sides of the piston for a reverse movement thereof.

5. The combination of transmission gears, gas pressure operated means including a piston for shifting the gears, a cylinder in which the piston is movable to shift said gears, an intake valve for admitting gas to the cylinder, an outlet valve through which gas escapes, a double-plug arrangement in each of the valves, means operated by force of the piston when moving in one direction in the cylinder to simultaneously shift both plug arrangements to unseat diametrically opposite plugs of the intake and outlet valves in readiness to admit gas to the cylinder at one side of the piston and permit the escape of residual gas from the cylinder at the opposite side of the piston, and tension-operated means causing a reverse movement of the plug arrangements at the end of the piston stroke resulting from said admission of gas, thereby unseating the diametrically opposite plugs of the intake and outlet valves which were formerly seated in readiness to admit gas to the cylinder at one side of the piston and permit the escape of residual gas from the cylinder at the opposite side of the piston thereby to perform a return stroke of the piston.

6. The combination of a gas conduit, transmission gears, gas pressure-operated means for shifting the gears, a pedal-operated valve for diverting gas from the conduit to said shifting means to perform a gear shift, an intake valve maintained in a predetermined open position by the pressure of said gas to thereby appropriately admit the gas to said shifting means for the performance of said gear shift, and means to reverse the position of said intake valve upon termination of gas pressure following a release of said pedal-operated valve thereby placing said intake valve in condition to cause the flow of gas in another direction in said shifting means for the performance of another gear shift.

7. The combination of transmission mechanism, a plurality of blocks, pressure operated means for moving the blocks in opposite directions, shift rods associated with said mechanism, shift blocks by means of which a shift rod is carried, means to couple a shift block to any one of the oppositely movable blocks to thereby utilize the particular movement for shifting a gear, and remotely controlled selective electro-magnetic mechanism for performing the coupling function.

8. The combination of transmission gears, fluid pressure operated means for shifting said gears, said means including a piston, a rack carried by the piston, a block carried by the piston rod, a second block, means which upon movement of the piston causes movement of the blocks in opposite directions, shift rods associated with the mechanism, a fixed block by each of which a rod is carried, and means to couple one of the shift blocks to either of the oppositely movable blocks to utilize a particular movement in shifting a transmission gear.

9. The combination of transmission gears, fluid pressure operated means for shifting said gears, said means including a piston having a rod, racks on the piston rod, rack rods geared to the piston rods to move in a direction opposite to that of the piston rods. blocks carried by the piston and rack rods respectively to partake of said opposite movement, shift rods associated with the transmission gears, shift blocks by means of which a shift rod is carried, and means to couple a shift block to one or the other of said oppositely movable blocks to utilize a particular movement in shifting a gear.

10. The combination of transmission gears, fluid pressure operated means for shifting the gears including a piston and shifting rod, a pair of blocks one of which is carried by the piston rod, means carrying the other block being so operated by the piston rod that the blocks are movable in directions opposite to each other, shift rods associated with said transmission gears, shift blocks by each of which a shift rod is carried, coupling means rockably mounted on each of the shift blocks, and electro-magnetic means so acting upon a selected coupling means that a movement of one of the oppositely movable blocks causes a rocking of said selected coupling means and a resulting coupling action upon said block so that the movement thereof is utilized to shift a gear.

11. The combination of transmission gears, means for shifting the gears including blocks, pressure operated means for moving the blocks in opposite directions, shift rods associated with the transmission gears, couplings carried by each shift rod, and means primarily actuated by partaking of the movement of one of the rods to cause engagement thereof with the oppositely moving block resulting in a shift of the associated rod and one of the gears in the particular direction of movement of said other block.

12. The combination of transmission gears, a pair of blocks, pressure operated means for moving the blocks in opposite directions, shift rods associated with said transmission gears, rockable coupling means carried by the shift rods, an independent element associated with each coupling means, one of which is initially movable with one of the blocks, and connecting means between said coupling means and said elements by which the initial movement of said element causes rocking of the respective coupling into connection with the other block whereupon the opposite movement of said block is utilized to separate said element from the first block and produce a gear shift through said coupling means.

13. The combination of transmission gears, a plurality of blocks, pressure operated means for moving the blocks in opposite directions, shift rods associated with the transmission gears, and coupling means carried by the shift rods being actuated by the movement of one of the blocks in one direction to make engagement with the oppositely moving block, thereby to utilize the motion of said opposite block to produce a gear shift through the respective rod.

14. The combination of transmission gears, a plurality of blocks, pressure operated means for moving the blocks in opposite directions, shift rods associated with the transmission gears, rockable coupling means carried by the rods, and electro-magnetic means associated with each block by energization of one of which electro-magnetic means the movement of the respective block causes rocking of the respective coupling means to engage the oppositely moving block whereupon the movement of said opposite block acts through the respective rods to produce a gear shift.

15. The combination of transmission gears, a plurality of blocks, fluid pressure operated means for moving the blocks, an electro-magnet carried by each block, electrical circuits embracing said electro-magnets there being a switch in each, a shift rod associated with the transmission gears, a coupling associated with each shift rod, and means which is held upon energization of an electro-magnet upon closure of a selected switch and by which the initial movement of the respective block causes engagement of the coupling means with the oppositely moving block to produce a gear shift, the opposite motion of said block breaking the hold of said energized electro-magnet upon said means.

16. The combination of transmission gears, a shift block, fluid pressure operated means to move said block, a shift rod associated with the gears by which rod the block is carried, another block, pressure operated means by which said other block is movable in respect to the shift block, a coupling which is rockable upon the shift block, and means to rock the coupling to engage said other movable block so that the movement is utilized to actuate the shift block for the shifting of a gear.

17. The combination of transmission gears, a shift block, a shift rod associated with the gears by which rod the block is carried, a second block, pressure operated means by which the second block is movable in respect to the shift block, a latch which is rockable upon the shift block, an arm to operate the latch, and means in connection with the arm being ultimately movable with said second block but initially retarded thereby to rock the latch to engagement with the movable block.

18. The combination of transmission gears, a plurality of blocks, fluid pressure operated means for oppositely moving the blocks, a thrust rod associated with the transmission gears, a shift block by which the rod is carried, a latch rockably carried by the shift block, said latch having an arm, an electro-magnet carried by each oppositely movable block, an armature arrangement with which the arm arrangement is associated, and a remote electrical control for energizing one of the electro-magnets thereby to hold the armature arrangement at the initial separating movement of the movable blocks and cause rocking of the latch into engagement with one of said blocks to cause the shifting of gears, said engagement of the latch with said blocks then pulling the armature arrangement away from said energized electro-magnet whether or not the control circuit is closed.

19. The combination of transmission gears, a block having a lug, fluid pressure operated means for moving said block, a relatively stationary latch having an associated shift rod, and means causing rocking of the latch into engagement with the lug so that the rod is carried with the block upon movement of the block thereby to produce a gear shift.

20. The combination of transmission gears, a pair of blocks, each having a lug, fluid pressure operated means for oppositely moving the blocks, a relatively stationary latch situated between the blocks and having an associated shift rod, and means initially employing the movement of one of the blocks to rock the latch into engagement with the lug of the oppositely moving block so that said block carries the latch and rod to produce a gear shift.

21. The combination of transmission gears, a pair of blocks each having a pair of lugs, fluid pressure operated means for oppositely moving the blocks, a shift block situated between said movable blocks, a pair of latches carried by the shift block, a shift rod connected with the shift block, and means employing the initial movement of one of the movable blocks to simultaneously rock both latches upon the shift block until they engage the pair of lugs of the oppositely moving block establishing a connection for shifting a gear.

22. The combination of transmission gears, a pair of blocks, fluid pressure operated means for oppositely moving the blocks, a pair of lugs carried by each block, a relatively stationary shift block situated between said blocks and having an associated shift rod, a pair of latches rockably mounted upon the shift block, an arm associated with each latch, an independently movable block with which the ends of the arms have engagement, and means by which said independently movable block is held to one of said movable blocks upon initial movement thereof sufficiently long to simultaneously rock both the latches by means of said arms causing engagement of said latches with the lugs of the oppositely movable block for the purpose of shifting a gear, the engagement of the latches with said block pulling said independently movable block away from the first block.

23. The combination of transmission gears, a plurality of blocks, fluid pressure operated means for oppositely moving the blocks, a shift rod, a pair of latches, a shift block by which the latches are rockably carried and to which the shift rod is attached being situated between said movable blocks, arms associated with the latches extending toward each other, a grooved block into the grooves of which the ends of the arms extend, means upon which the grooved block is guided for independent sliding motion, and means to hold said grooved block up to one of said movable blocks during initial movement thereof causing sliding of the grooved block and rocking of the latches into engagement with the other movable block the subsequent movement of which pulls the grooved block away from the first movable block while shifting a gear.

24. The combination of transmission gears, a plurality of blocks, fluid pressure operated means for oppositely moving the blocks, a shift rod, a pair of latches, a shift block to which the shift rod is attached and upon which the latches are rockably mounted, said block being situated between the movable blocks, an electro-magnet associated with each of said blocks, an armature block carrying armatures and having grooves, arms associated with the latches extending toward each other and into the grooves, means including rods upon which the armature block is guided for independent movement, and a remote electrical control for energizing either electro-magnet to hold the adjacent armature during the initial movement of the respective block thereby to rock said latches into engagement with the oppositely moving block in the performance of a gear shift, said engagement pulling the armature away from said energized electro-magnet.

25. The combination of transmission gears, a pair of blocks, fluid pressure operated means for moving the blocks toward and away from each other, a shift rod having a spring block situated between the movable block, a latch rockably carried by the shift block, an electro-magnet associated with each movable block, a remote control for energizing either electro-magnet, and an armature arrangement associated with the shift block being held by the energized electro-magnet while the movable blocks are closed in upon said shift block thereby to detain said shift block by virtue of said holding upon the initial separating movement of said movable blocks to rock the latch into engagement with the oppositely movable block whereupon the shift block and armature arrangement are carried with said oppositely movable block while shifting a gear.

26. The combination of transmission gears, a pair of blocks, means for moving said blocks, oppositely moving gear shifting members including piston and rack rods to which said blocks are respectively connected, a shift rod associated with said gears, a shift block attached to the shift rod being mounted upon and guided by said piston and rack rods and situated between said pair of blocks, and means for coupling said shift block to either of said pair of blocks for movement of said shift rod to perform predetermined gear shifts.

27. The combination of transmission gears, means to shift said gears including a fluid pressure movable piston, a piston rod connected thereto, a rack rod geared to the piston rod to move in a direction opposite to a particular direction of movement of said piston rod, a pair of blocks respectively attached to the piston and rack rods, a relatively stationary shift block mounted upon and guided by the piston and rack rods being situated between said movable blocks, a shift rod associated with the transmission gears, being attached to the shift block, and latch means carried by said blocks being engageable with either movable block for action of the shift rod in one or the other direction in which action the shift block slides upon the piston and rack rods in the direction of the movable block with which the latch has engagement.

28. A gear shifter comprising a spring including front and rear castings, a pair of blocks movable between said castings, a gear shift rod having an attached shift block situated between said movable blocks, a piston rod guided at one end by the front casting and furnishing a guided support for said shift block, a rack rod guided at one end in the front casting providing another support for said shift block, a bridge associated with the rear casting providing a guide and support for each opposite end of the piston and rack rods, a piston carried by the piston rod being subjected to pressure to move the piston rod, means then operated to move the rack rod in the opposite direction, and means connecting the movable blocks to the piston and rack rods respectively so that opposing movements in certain directions slide the shift blocks to a predetermined direction or a prearranged gear shift.

29. A gear shifter comprising a shift rod, a shift block to which the rod is attached, a pair of blocks movable toward said shift block to place the latter in a gear neutralizing position, a latch rockably carried by the shift block, an electro-magnet associated with the movable block, armatures associated with said latch, a remote electrical control for energizing a selected electro-magnet thereby to hold an adjacent armature, said control including a circuit embracing said electro-magnet, relatively stationary contacts, complementary contacts carried by the movable blocks both being included in said circuit and requiring the aforesaid position of the movable blocks in respect to the shift block for the closure of the particular circuit, and means for moving the movable blocks away from the shift block, the controlling of the energized electro-magnet causing rocking of the latch into engagement with the oppositely moving block for the transportation therewith of the shift block, the disengagement of the held armature and the braking of the energizing circuit at the contacts which then become separated.

30. A gear shifter comprising a shift rod, a shift block to which the rod is attached, a pair of blocks, means for oppositely moving the blocks, means to couple one of said pair of blocks to the shift block for actuating the shift block to produce gear shifts, said last means comprising a latch carried by the shift block, electro-magnetic means by which the latch is caused to rock into engagement with one of the pair of blocks by virtue of the opposite movement of the other, an electrical circuit for each electro-magnetic means including remote push buttons, and contacts controlling said circuits at the movable blocks, said blocks causing engagement of said contacts when at one extremity of movement and the separation of said contacts when traveling toward the other extremity of movement.

31. A gear shifter comprising a shift rod, a shift block to which it is attached, a pair of blocks, means for oppositely moving the blocks, means to couple the shift block to either oppositely movable blocks to produce gear shifts, comprising a plate attached to each of the oppositely movable blocks, an electro-magnet mounted upon the plates, a latch rockably carried by the shift block, an armature arrangement associated with the latch, electrical circuits embracing the electro-magnet and including elective push buttons for partial closure of a particular circuit, a pair of relatively stationary contacts, and complementary movable contacts carried by said plates being in engagement when said movable blocks are at one extremity of their movement thereby to complete the selected circuit for energization of the respective electro-magnets and holding of the armature arranged preparatory to subsequent separating movement of said blocks.

32. A gear shifter comprising a shift rod, a shift block to which it is attached, a pair of blocks, means for oppositely moving the blocks, means to couple the shift block to either oppositely movable blocks to produce gear shifts, comprising a plate attached to each of the oppositely movable blocks, an electro-magnet mounted upon the plates, a latch rockably carried by the shift block, an armature arrangement associated with the latch, electrical circuits embracing the electro-magnet and including elective push buttons for partial closure of a particular circuit, a pair of relatively stationary contacts, complementary movable contacts carried by said plates being in engagement when said movable blocks are at one extremity of their movement thereby to complete the selected circuit for energization of the respective electro-magnets and holding of the armature arrangement preparatory to subsequent separating movement of said blocks, and means for separating the movable blocks whereupon the held armature arrangement causes rocking of the latch into engagement with one of said blocks.

33. A gear shifter comprising a shift rod, a shift block to which it is attached, a pair of blocks, means for oppositely moving the blocks, a latch carried by the shift block being engageable with one of the oppositely movable blocks to utilize said movement in the shifting of a gear, and means including bumper springs so situated as to receive the thrust of one of said movable blocks upon an idle stroke thereof when the latch has been engaged with the other block.

34. A gear shifter comprising a pair of oppositely movable blocks, a fluid pressure operable piston having a rod carrying one of the blocks, a pair of rack rods carrying the other block and being so actuated by the piston rod that the rack rods partake of reverse movement, a shift rod, a shift block to which it is attached, a latch carried by the shift block being engageable with either piston or rack blocks, and means including bumper springs to absorb the thrust of the piston at the piston block upon an idle stroke of the piston block when the latch has been engaged with the rack block for movement in the direction thereof.

35. A gear shifter having a frame including a front casting, means constituting a bumper comprising, a plug occupying a portion of a chamber in said casting and projecting at the rear of the casting, springs in said chamber supporting said plug, and a movable block being engageable with said projecting plug upon certain movements of the block.

36. A gear shifter comprising a shift rod, a shift block to which it is attached including upright extensions, a pair of blocks, means for oppositely moving the blocks, a pair of lugs on each of the blocks, a latch rockably mounted upon each upright extension being engageable with a pair of lugs so that the movement of the particular block may be imparted to the shift block, and means carried by said upright extensions normally holding the latches in the non-engaging position, said means including leaf springs bearing upon the latches.

37. A gear shifter comprising a cylinder, a piston movable in said cylinder, inlet and outlet valves for controlling the flow of pressure fluid in respect to the cylinder for the operation of the piston, a block which is moved by the piston as a function in shifting gears, a plate carried by the block, stems of said valves passing through the plate, means associated with the valve stems for so setting the valves that the piston is caused to move in one direction, and bumper means carried by said plate causing operation of the valve stems to shift the valves upon resulting movement of said block.

38. A gear shifter comprising a cylinder, a piston movable in the cylinder, gear shifting means operable by the movements of the piston, means to control the movements of the piston comprising a pressure fluid intake valve having confronting valve seats, a double plug valve reciprocable in the intake valve to engage either seat and permit the flow of fluid to the corresponding end of the cylinder, and means stationed in said valve between the double plug providing a guide and support.

39. A gear shifter comprising a cylinder, a casting by which the cylinder is carried, said casting having a chamber of reduced diameter, a pressure fluid operated piston in the cylinder having a rod extending through the casting and chamber, gear shifting means actuated by the movements of the piston, a support affixed to the casting over the mouth of the chamber guiding the piston rod and having openings for the admission of fluid to the chamber, and a second piston carried by the rod operable in said chamber to prevent the escape of gas around the piston rod and tending to reduce the speed of the main piston when pressure is expended on that side of the main piston adjacent to the second piston.

WILLIAM G. STEVENS, Jr.